UNITED STATES PATENT OFFICE.

EDWARD J. WINSLOW, OF CHICAGO, ILLINOIS.

PROCESS FOR MAKING CEMENT.

No. 913,794.      Specification of Letters Patent.      Patented March 2, 1909.

Application filed August 17, 1906. Serial No. 331,084.

*To all whom it may concern:*

Be it known that I, EDWARD J. WINSLOW, residing at Chicago, in the county of Cook and State of Illinois, have invented certain new and useful Improvements in Processes for Making Cement, of which the following is a full, clear, and exact description, such as will enable others skilled in the art to which it appertains to make and use the same.

This invention relates to water-proof cements and more particularly it concerns certain improved methods for imparting superior water-proofing qualities to ordinary hydraulic cement, such as Portland cement.

While this invention is not to be limited to the following precise embodiments, it will be conducive to clearness to disclose the same in such connection.

One object of this invention is to formulate a process whereby a water-proof cement may be produced at small cost and given the capacity of being able to withstand deterioration in moist climates.

A further object of this invention is to provide a cement which, while capable of being easily worked, will not be unduly absorbent to water, either before mixing the same, or after the final setting thereof.

Another object is to produce a cement which is particularly adapted for being employed in a water-proofing capacity, and which will permanently retain its original desirable properties.

As tending to render better understood the essentials of this invention, it may be preliminarily stated that much difficulty has heretofore been experienced in producing a cement which, while of a thoroughly waterproof nature after "setting", will at the same time be sufficiently absorbent prior to setting to permit of a ready initial mixing with water. Previous attempts have resulted in a cement which either does not possess full "setting" powers, or which is insufficiently water-proof after setting. Another difficulty that has been encountered in the cements of the prior art, resides in the fact that such cements rapidly deteriorate by exposure to damp air.

In carrying out the preferred embodiments of this invention, I preliminarily prepare a water-proofing compound which is peculiarly adapted for being incorporated into the cement to be given water-proofing qualities. Such compound may be prepared by forming an emulsion between a water-proofing agent, such as wax or other oleaginous substances, and a suitable reactive agent or carrier which may consist of an alkali, such as hydrated lime or the like. To this end, I prefer to first boil hydrated lime with water, and into such milky solution I prefer to introduce a suitable wax, such as Japan wax. While various proportions of these ingredients are contemplated, I prefer in practice to use two parts of the hydrated lime to one part of the Japan wax or other oleaginous substance. The emulsion thus prepared is then boiled to a thick paste and then dried in a suitable manner. To this end, various means may be employed, such as a filter-press, centrifugal or vacuum driers, and after the excess has been removed, the partially dried paste may be further dried by spreading on the floor or other surface and heating gently if desired. The mass thus produced is then preferably reduced to a powder and is now available for the purpose of imparting water-proofing qualities to such types of ordinary cement as may be preferred. This dry water-proofing powder and the method of making the same will be made the subject of a divisional application for patent and is therefore not specifically claimed herein, but is described to render this disclosure more complete.

Although the aforesaid novel water-proofing compound may be incorporated into an ordinary cement in divers ways, with more or less advantage, I will now state the manner in which I preferably carry out this part of my invention, inasmuch as it is believed to represent a very substantial improvement in the art and result in a particularly excellent water-proof cement. In doing this, I intimately mix the cement and the water-proofing compound by a dry grinding action, as distinguished from the wet or damp grinding heretofore characteristic of certain attempts to produce a satisfactory water-proof cement. This dry grinding may be done in any apparatus suitable for the purpose, and in practice I intimately commingle in this way the ingredients in the proportions of approximately 98% of a good high grade Portland cement with about 2% of the aforesaid water-proofing compound.

In certain cases, very beneficial results are obtained by thoroughly grinding the ingredients into a very intimate association by prolonging the grinding for nearly two hours. After the grinding has continued for the requisite period, it will be found that a very superior product is obtained, and one which to an extraordinary degree possesses water-proofing properties. It has been found by long time commercial experiments that a cement, produced either in this specifically improved manner or otherwise within the broad terms of this invention, may be applied and thereafter freely exposed to a moist atmosphere without undergoing any material deterioration, while at the same time, such cement may be very readily mixed with water preparatory for use. When dry and after "setting", such cement is not only water-proof, but furthermore has the very valuable capacity for permanently retaining colors imparted to it during the process of manufacture. Moreover, its strength has been in no wise materially impaired by this treatment, and in many cases tests have actually shown a slight improvement in this respect.

A cement prepared as above is well suited to withstand long ocean shipments without special precautions, which is a questionable possibility with such ordinary cements as have heretofore been made.

The terms I have adopted in disclosing my invention have been employed in an illustrative rather than in a definitive sense, and accordingly I desire that the same shall be interpreted with the full range of equivalency to which I am rightly entitled, and to this end, such other specific substances and analogous processes as my disclosure will naturally suggest in the light of current knowledge to those skilled in the art as available for producing like results, are to be regarded as at least representing embodiments of the generic features of this invention, although the special advantages characteristic of the more intense aspect of my invention may not be fully attained.

I claim:

1. The process of preparing a relatively water proof cement consisting in dry grinding pulverulent cement with an anhydrous water proofing compound composed in part of an inorganic alkaline agent.

2. The process of preparing a relatively water proof cement consisting in dry grinding cementitious material with a relatively small quantity of a suitable water proofing agent.

3. The process of preparing a relatively water proof cement consisting in intimately mixing a dry pulverulent cement with a relatively small quantity of a dry pulverulent water proofing compound containing about 2 parts of lime and 1 part of an oleaginous substance.

4. The process of preparing a relatively water proof cement consisting in intimately mixing a dry pulverulent cement with approximately two per cent. of a dry pulverulent water proofing compound composed of lime and an oleaginous substance.

5. The process of preparing a relatively water proof cement consisting in dry grinding a pulverulent cement and a relatively small quantity of a water proofing compound composed largely of hydrated lime.

6. The process of preparing a relatively water proof cement consisting in dry grinding pulverulent cement with approximately two per cent. of an anhydrous water proofing compound.

7. The process of preparing a relatively water proof cement consisting in dry grinding cementitious material with a water proofing agent containing an oleaginous substance.

8. The process of preparing a relative water proof cement consisting in mechanically mixing a dry pulverulent cement with a dry pulverulent water proofing compound containing an oleaginous substance.

9. The process of preparing a relatively water proof cement consisting in dry grinding a pulverulent cement and a pulverulent water proofing compound containing about 1 part of an oleaginous substance and about 2 parts of hydrated lime.

10. The process of preparing a relatively water proof cement consisting in dry grinding cementitious material with a relatively small quantity of a water proofing agent containing a wax.

11. The process of preparing a relatively water proof cement consisting in intimately mixing a dry pulverulent cement with a relatively small quantity of a dry pulverulent water proofing compound containing a wax.

12. The process of preparing a relatively water proof cement consisting in dry grinding cementitious material with approximately two per cent. of a suitable water proofing compound containing an oleaginous substance.

13. The process of preparing a relatively water proof cement consisting in intimately mixing a dry pulverulent cement with approximately two per cent. of a dry pulverulent water proofing compound containing an oleaginous substance.

14. The process of preparing a relatively water proof cement consisting in dry grinding a pulverulent cement with a relatively small quantity of a pulverulent water proofing compound containing an oleaginous substance.

15. The process of preparing a relatively water proof cement consisting in dry grinding a pulverulent cement with approximately two per cent. of a pulverulent water proofing compound containing an oleaginous substance and lime.

16. The process of preparing a relatively water proof cement consisting in dry grinding a pulverulent cement with a pulverulent water proofing compound containing wax and lime.

17. The process of preparing a relatively water proof cement consisting in dry grinding a pulverulent cement with a pulverulent water proofing compound containing Japan wax and lime.

18. The process of preparing a relatively water proof cement consisting in dry grinding a pulverulent cement with a pulverulent water proofing compound containing approximately one part of Japan wax with two parts of lime.

19. The process of preparing a relatively water proof cement consisting in first making a boiling solution of approximately two parts of hydrated lime, intimately introducing into said hot solution approximately one part of Japan wax, boiling or agitating said mixture until a complete emulsion results, then drying said emulsion and rendering pulverulent the same, and secondly dry grinding said prepared compound with an excess of cement.

20. A relatively water proof cement consisting of not less than ninety eight per cent. of Portland cement intimately mixed with approximately two thirds per cent. of Japan wax and the remainder of hydrated lime.

21. A relatively water proof cement consisting of approximately ninety eight per cent. of Portland cement having ground therewith a compound containing Japan wax or other oleaginous substances and hydrated lime.

In testimony whereof I affix my signature in the presence of two witnesses.

EDWARD J. WINSLOW.

Witnesses:
C. H. WILSON,
ALBERT F. NATHAN.